Oct. 5, 1965 J. M. HARTZ 3,210,480

EASILY REMOVABLE FINGER WHEEL AND MOUNTING

Filed April 13, 1962 2 Sheets-Sheet 1

INVENTOR.
Joseph M. Hartz
BY C. A. Bullbrandsen
Atty.

EASILY REMOVABLE FINGER WHEEL AND MOUNTING

Filed April 13, 1962 2 Sheets-Sheet 2

INVENTOR.
Joseph M. Hartz

BY C. A. Gulbrandsen
Atty.

3,210,480
EASILY REMOVABLE FINGER WHEEL AND MOUNTING

Joseph M. Hartz, Elmhurst, Ill., assignor to Automatic Electric Laboratories, Inc., Northlake, Ill., a corporation of Delaware
Filed Apr. 13, 1962, Ser. No. 187,296
7 Claims. (Cl. 179—90)

This invention relates to telephone dials and more particularly to a mounting arrangement for the finger wheel of such dial. The present invention is an improvement over the finger wheel and mounting arrangement shown in U.S. Patent 2,666,097.

It is therefore an object of this invention to provide a simple and economical mounting for a finger wheel.

It is a further object to provide a finger wheel which may be rapidly removed by an authorized person.

It is a feature of this invention to provide a novel method of locking a finger wheel to a dial shaft.

It is a further feature to provide a mounting for a finger wheel which eliminates relative movement between the mounting disk and the finger wheel when in mutually locked condition.

Briefly, the embodiment of the invention described herein comprises a molded finger wheel which has a cylindrical shaped opening or well in one face thereof with notches in the periphery of that opening. A clamped disk having four lobes about its periphery extends from the dial shaft, and the finger wheel mounts to this clamping disk by placing the finger wheel on the disk with the notches over the lobes and rotating the wheel about ⅛ turn. Near completion of this ⅛ rotation a latching finger, which extends from the periphery of the clamping disk, slips from the cylindrical wall of the above opening into a stop securely locking the finger wheel in place on the clamping disk. Removal of the finger wheel is accomplished by inserting a tool through a small hole in the outer surface of the dial directly above the free end of the latching finger, and pushing the latching finger out of the stop so that it automatically snaps into a recess above said stop. The wheel is thereby rotationally unlocked and kept in an unlocked condition even after withdrawal of the aforementioned tool. The finger wheel is rotated completely clockwise until the end of the latching finger is moved off the last mentioned recess, guided by a sloping surface of the recess. The finger wheel is then allowed to spin to its normal position and can be lifted free of the clamping disk.

The invention will be more fully understood from the following detailed description of an embodiment thereof. In the accompanying drawings:

FIG. 1 shows an edge view of a dial partly in cross section with the finger wheel mounted in place.

FIG. 2 shows a top view of a dial including the finger wheel. The four lobed disk on which the finger wheel is mounted and the corresponding notches into which these lobes fit are shown in phantom. Also visible is the latching finger which extends from the periphery of the mounting disk.

Figure 1:
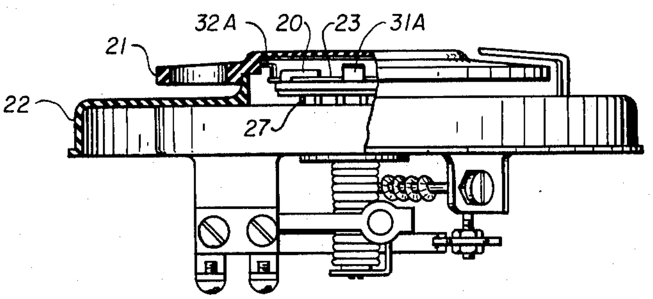
Figure 2:
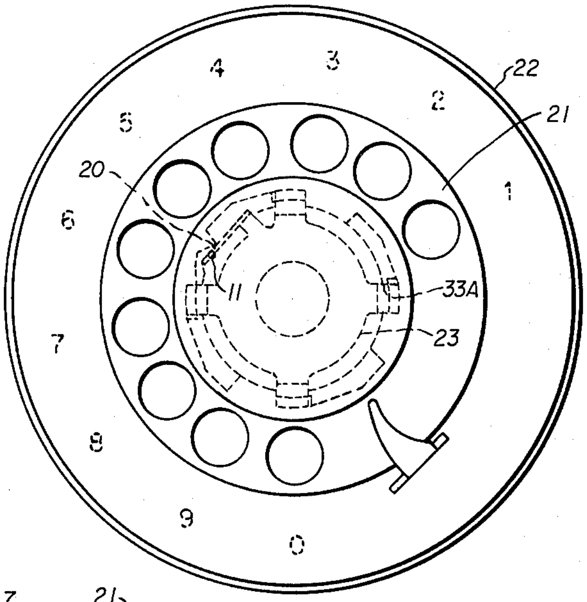

Referring now to the drawings, in FIG. 1 and 2, dial 22 is shown with finger wheel 21 locked to mounting disk 23. Disk 23 is in turn secured to the end of dial shaft 27 which extends from the center of dial 22. Finger wheel 21 has four notches 31 to 34, shown in FIG. 3, corresponding to the L-sahped lobes 31A to 34A (seen in FIGS. 4 and 5) of mounting disk 23. Finger wheel 21 is mounted on disk 23 by placing lobes 31A to 34A of the disk into notches 31 to 34 respectively and rotating wheel 21 approximately ⅛ turn counterclockwise. During this rotation, lobe 31A, for example, moves from notch 31 across ramp 26 (shown in FIGS. 6, 7, and 8) and into slot 16 at the end of notch 31. Lobes 32A to 34A move within notches 32 to 34 in a similar manner.

Figure 3:
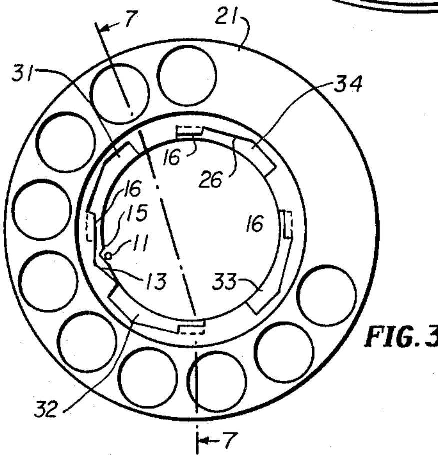
FIG. 3 is a bottom view of the finger wheel showing the cylindrical shaped opening or well and the notches which have been cut into the peripheral surface of that opening.
Figure 4:
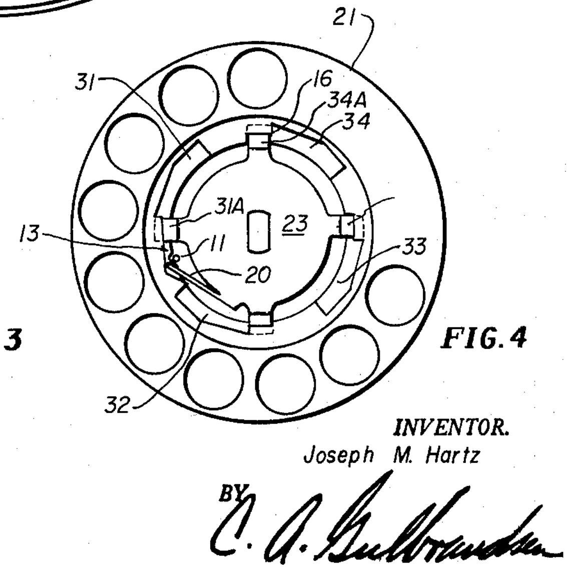
FIG. 4 is a bottom view of the finger wheel as it appears when mounted on the four lobed disk and with the latching finger in its unlocked position.
Figure 5:
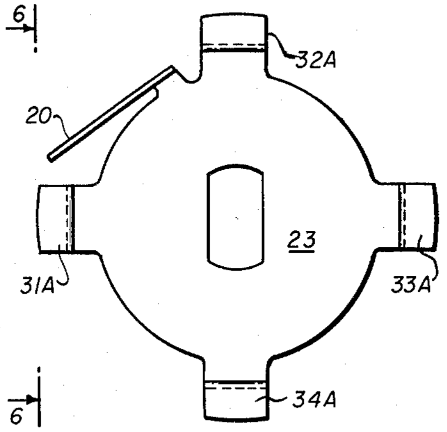
FIG. 5 is a top view of the four lobed disk on which the finger wheel is mounted.
Figure 6:
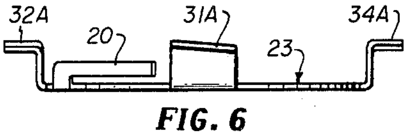
FIG. 6 is a side view of the mounting disk taken along line 6—6 of FIG. 5 showing the lobes as being L-shaped.

It can be seen in FIGS. 3 and 4 that the radial depth of notches 31 to 34 is greater than that of slots 16 and that this change in depth is accomplished by connecting notches 31 to 34 and their respective slots 16 with ramps 26. In this manner, during the aforementioned counterclockwise rotation each of the lobes 31A to 34A is flexed slightly toward the center of disk 23 so as to tightly hold disk 23 within the finger wheel 21 and to thereby prevent radial movement between dial 21 and disk 23. Axial movement between disk 23 and finger wheel 21 is prevented by placing a slight angle on the tip portion of each lobe 31A to 34A (as seen in FIG. 6) relative to the opening of slot 16. This slight angle causes the leading edge of the tip portion of each lobe 31A to 34A to bear against the top surface (as viewed in FIGS. 8 and 9) of slot 16, and the trailing edge to bear against the bottom of said slot.

During the aforementioned ⅛ counterclockwise rotation of finger wheel 21, the free end of latching finger 20 moves across surface 15 which is part of the original cylindrically shaped opening (as shown in FIG. 3) into which notches 31 to 34 have been cut. Near completion of this ⅛ rotation of finger wheel 21, latching finger 20 snaps against surface 10 of an angularly shaped recess 18 with the end of finger 20 adjacent to abutment 24 formed by this recess. At this point in the rotation each of the four lobes 31A to 34A strikes the end of its respective slot 16 to stop further counterclockwise rotation of finger wheel 21. Clockwise rotation of disk 23 is prevented by the end of latching finger 20 coming against abutment 24. Finger wheel 21 is thus securely locked to mounting disk 23.

Figure 7:
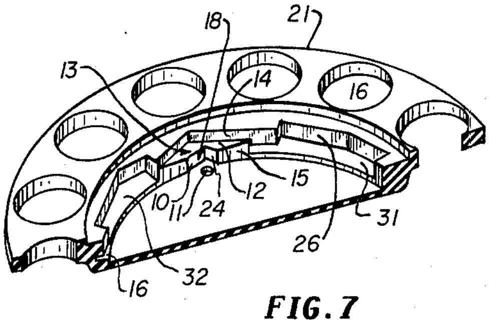
FIG. 7 is an enlarged perspective cross section taken along lines 7—7 of FIG. 3 showing the configuration of the notches and the finger wheel.
Figure 8:
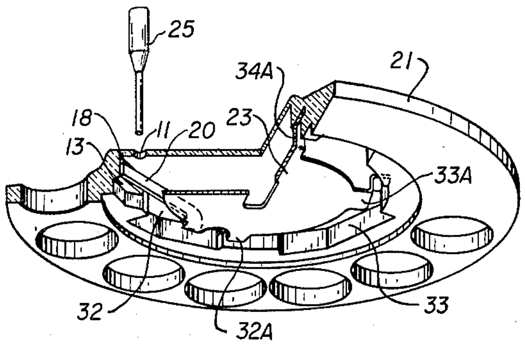
FIG. 8 is an enlarged perspective view of the finger wheel with the mounting disk inserted therein. The finger wheel and mounting disk are shown partly in cross section with the locking finger in its locked position.
Figure 9:
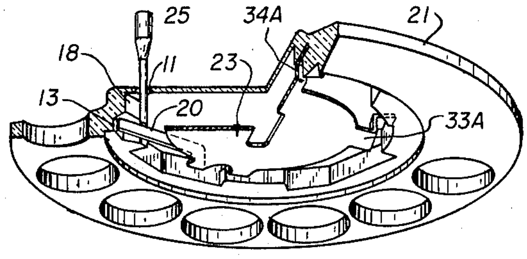
FIG. 9 is the same as FIG. 8 except with the locking finger pushed into its unlocked position.

An authorized person may easily remove finger wheel 21 by the insertion of tool 25 in hole 11 until the tool engages latching finger 20, and depressing it until the free end of finger 20 snaps against surface 14 of recess 13 as shown in FIGS. 7 and 9.

As will be noted from FIG. 7, recess 13 is provided at the wall of the aforementioned cylindrical opening in a plane parallel and adjacent to the plane of angular recess 18. The free end of finger 20 is thus held in an out of the way or unlocked position by the separating wall 12 between recesses 13 and 18 so that tool 25 may be withdrawn from aperture 11. This greatly facilitates the removal of the finger wheel. Wheel 21 may then be rotated clockwise until dial shaft 27 (and disk 23) stop in the fully wound up position of the dial, and further rotated until the end of latching finger 20 slides along sloping surface 14 until it reaches the end of separating wall 12 at which point it is allowed to snap down into the plane of recess 10. Finger wheel 21 (and dial shaft 27) is then allowed to return to its normal position and can be lifted free of the clamping disk.

It is noted that when latching finger 20 is in its locked position (that is, when the end of finger 20 is against abutment 24 and the flat side of finger 20 is adjacent to surface 10) finger 20 presses outwardly against surface 10. As a result of this outward pressure, as soon as finger 20 is pushed downwardly as viewed in FIG. 9 away from surface 10 by tool 25, finger 20 automatically snaps outward against surface 14 as mentioned above without further urging by tool 25. It can be seen that surface 14 slopes gradually inwardly toward the center of the cylindrical shaped opening of dial 21. As finger 20 travels along surface 14, it exerts, by reason of the combined resiliency of finger 20 and the slope of surface 14, an increasingly greater force against surface 14. Therefore, as this force becomes greater, finger 20 becomes nearly parallel to surface 14. The free end of finger 20 thus does not dig into surface 14, but merely slides along that surface.

While the invention has been described with reference to a particular environment, other applications will be readily apparent to those skilled in the art. The invention, therefore, should not be limited to the particular arrangement shown and described but should cover all modifications, within the spirit and scope of the claims.

What is claimed is:

1. In a telephone dial assembly:

a rotatable shaft;

a finger wheel having a generally cylindrically shaped opening in one face thereof, said opening having a plurality of notches in the peripheral wall thereof, each said notch including a primary recess ending in a relatively thin slot, said peripheral wall also having an angular shaped recess located between two said notches, said angular shaped recess in communication with a restricted aperture extending from the opposite face of said finger wheel; and a mounting disk secured to said shaft having a plurality of L-shaped lobes at its periphery each insertable into one of said primary recesses, and upon relative rotation between said finger wheel and said disk slidable into said slot, said disk also having a resilient finger extending from its periphery, the outer end of said finger upon said relative rotation moving along said peripheral wall until said end drops into said angular shaped recess, thereby locking said finger wheel to said mounting disk.

2. In a telephone dial assembly:

a rotatable shaft;

a finger wheel having a generally cylindrically shaped opening in one face thereof, said opening having a plurality of notches in the peripheral wall thereof, each said notch including a primary recess ending in a relatively thin slot, said primary recess having a guide surface which slopes radially inwardly to merge with said thin slot; and a mounting disk secured to said shaft having a plurality of resilient L-shaped lobes at its periphery each insertable into one of said primary recesses and upon relative rotation between said finger wheel and said disk being gradually urged inwardly by said guide surface until said lobes become firmly positioned in said thin slot under radial pressure, whereby said mounting disk is held securely to said finger wheel.

3. In a telephone dial assembly the combination as claimed in claim 2 wherein:

the tip portion of said lobe which enters each said thin slot is at a slight angle to the opening of said slot, the leading edge of said tip portion bearing against the top of said slot and the trailing edge of said tip portion bearing against the bottom of said slot, whereby said tip portion of each said lobe is tightly held within its respective slot.

4. The combination with a telephone dial assembly having:

a rotatable shaft;

a finger wheel having a cylindrically shaped opening in one face thereof, said opening having a plurality of notches in the peripheral wall thereof, said peripheral wall also having a recess located therein in a first plane parallel to said face, said first recess having an angular shape and in communication with a restricted aperture extending from the opposite face of said finger wheel;

a mounting disk secured to said shaft having a plurality of lobes and a resilient finger extending from its periphery, each said lobe fitting into one of said notches, and said finger dropping into said first recess to lock said wheel to said mounting disk;

said peripheral wall also having a second recess radially deeper than the first recess and disposed in a plane parallel and adjacent to that of said first recess, said second recess having a surface sloping towards the center of said cylindrical opening, said finger being movable from said first recess to cause the free end of said finger to automatically snap against said sloping surface of said second recess, and upon relative rotation between said finger wheel and said disk the free end of said finger moves along said sloping surface until it no longer touches said sloping surface, said lobe strikes the end of its respective notch and said finger wheel may be lifted from said mounting disk.

5. The combination with a telephone dial assembly having:

rotatable shaft;

a finger wheel having a cylindrically shaped opening in one face thereof, said opening having a plurality of notches in the peripheral wall thereof, said peripheral wall also having a recess located therein in a first plane parallel to said face, said first recess having an angular shape and in communication with a restricted aperture extending from the opposite face of said finger wheel;

a mounting disk secured to said shaft having a plurality of lobes and a resilient finger extending from its periphery, each said lobe fitting into one of said notches, and said finger dropping into said first recess to lock said wheel against rotation with respect to said mounting disk;

said peripheral wall also having a second recess radially deeper than the first recess and disposed in a plane parallel and adjacent to that of said first recess, said finger being movable from said first recess so that the free end of said finger automatically snaps into said second recess, and said finger is rotationally unlocked with respect to said mounting disk and is maintained in an unlocked condition.

6. In a telephone dial assembly the combination as claimed in claim 5 wherein:

said finger is in the form of a leaf spring extending in a plane perpendicular to that of said mounting disk and being attached to said disk by a relatively short base portion permitting said leaf spring to be flexed also in its own plane.

7. In a telephone dial assembly:

a rotatable shaft having a mounting disc secured to one end thereof with a plurality of lobes and a resilient finger extending from the periphery thereof;

a finger wheel for attachment to said shaft having a circular recess in the back of the wheel with a series of grooves registering with said lobes and a pair of grooves registering with said finger;

each of said series of grooves having a lock position and one of said pair of grooves having a lock notch adjacent the lock positions;

said dial secured to said plate by placing said plate in said recess and rotating said dial to move said lobes into said lock positions until said lobes reach the lock positions in said series of grooves and until said finger snaps into the lock notch of said one of said pair of grooves;

a restricted opening extending through said dial from the front thereof to a position adjacent said lock notch;

said finger having tension which causes it to snap into and remain in said second of said pair of grooves when it is depressed;

the movement of said finger into the second of said grooves permitting free relative rotation of the dial and plate to detach the dial from the plate.

References Cited by the Examiner

UNITED STATES PATENTS 2,666,097 1/54 Breivogel -------------- 179—90

ROBERT H. ROSE, *Primary Examiner.*